US005473459A

United States Patent [19]
Davis

[11] Patent Number: 5,473,459
[45] Date of Patent: Dec. 5, 1995

[54] OPTICAL TELECOMMUNICATIONS SYSTEM USING PHASE COMPENSATION INTERFEROMETRY

[75] Inventor: Charles M. Davis, Centreville, Va.

[73] Assignee: Optimux Systems Corporation, Centreville, Va.

[21] Appl. No.: 160,856

[22] Filed: Dec. 3, 1993

[51] Int. Cl.$^6$ .............................. H04B 10/04; H04B 10/00
[52] U.S. Cl. ..................... 359/183; 359/156; 359/173; 359/161; 385/11; 385/14; 385/27
[58] Field of Search ....................... 359/152, 154, 359/156, 161, 173, 183, 188, 195; 356/45, 51; 385/11, 14, 27

[56] References Cited

U.S. PATENT DOCUMENTS

| | | | |
|---|---|---|---|
| 4,360,272 | 11/1982 | Schmadel et al. | 356/352 |
| 4,477,723 | 10/1984 | Carome et al. | 250/227 |
| 4,699,513 | 10/1987 | Brooks et al. | 356/345 |
| 4,755,668 | 7/1988 | Davis | 250/227 |
| 4,848,906 | 7/1989 | Layton | 356/345 |
| 4,860,279 | 8/1989 | Falk et al. | 370/1 |
| 4,866,698 | 9/1989 | Huggins et al. | 370/1 |
| 4,868,381 | 9/1989 | Davis | 250/227 |
| 4,882,775 | 11/1989 | Coleman | 455/619 |
| 5,191,614 | 3/1993 | LeCong | 380/49 |
| 5,206,924 | 4/1993 | Kersey | 356/351 |
| 5,223,967 | 6/1993 | Udd | 359/119 |

OTHER PUBLICATIONS

Janet L. Brooks, et al., Coherence Multiplexing of Fiber–Optic Interferometric Sensors, Oct. 1985.
A. Dandridge et al., Multiplexing of Interferometric Sensors Using Phase Carrier Techniques, Jul. 1987.
Charles M. Davis, et al., Micro–Miniature Fiber–Optic Accelerometer.
Clarence J. Zarobila, et al., Fiber–Optic Interferometric Temperature Sensor, 1987.
Rainer Kist, et al., Fiber–Optic Point Sensor Networks.

Primary Examiner—Leo H. Boudreau
Assistant Examiner—Rafael Bacares
Attorney, Agent, or Firm—Kerkam, Stowell, Kondracki & Clarke; William L. Feeney

[57] ABSTRACT

Optical telecommunications systems use phase compensation interferometry wherein receiver units have interferometer configurations with path length differences identical to path length differences of arms in interferometer configurations at corresponding transmitter units. Faraday rotating mirrors are used to minimize sensitivity to polarization effects. A modified Michelson interferometer structure is used to provide optical signals which convert to electrical signals in a form allowing relatively easy demodulation. A demodulation circuit uses the property whereby two signals have a 90° phase shift.

20 Claims, 6 Drawing Sheets

OPTICAL TELECOMMUNICATIONS SYSTEM USING PHASE COMPENSATION INTERFEROMETRY

BACKGROUND OF THE INVENTION

This invention relates to an optical telecommunications system. More specifically, this invention relates to an optical telecommunications system which uses phase compensation interferometry.

At present, digital and analogue transmission employ a variety of systems for telecommunications including point to point microwave radio, optical fiber cable link, copper cable link, and communication satellite transmission. Such systems are used for transmitting telephone calls, television signals, and other audio and/or visual signals as well as various data telecommunications. In recent years, the trend has been toward the use of increasing numbers of optical fiber links. Such systems generally use optical fiber in a passive role for transmitting data and communications point to point using conventional electronics for all amplification and multiplexing requirements. That is, the optical fiber cable between the transmitter and receiver is essentially a dumb link.

In present systems, information is usually multiplexed in time division format. The diverse signals are multiplexed together by combining them temporally. For example, 24 digital signal zero (DS0) level signals are sampled sequentially and combined to form the next level of signal transmission which is T1 (DS1). The outputs of 4 T1 transmitters may be sampled and stacked sequentially in time by a T2 (DS2) multiplexer. Similarly, the outputs of 28 T1 or 7 T2 transmitters may be sequentially sampled and combined by a T3 (DS3) multiplexer. This process of combining or multiplexing lower level telemetry signals is repeated many times until signals in the Gb/snd range are produced.

Figure 1:
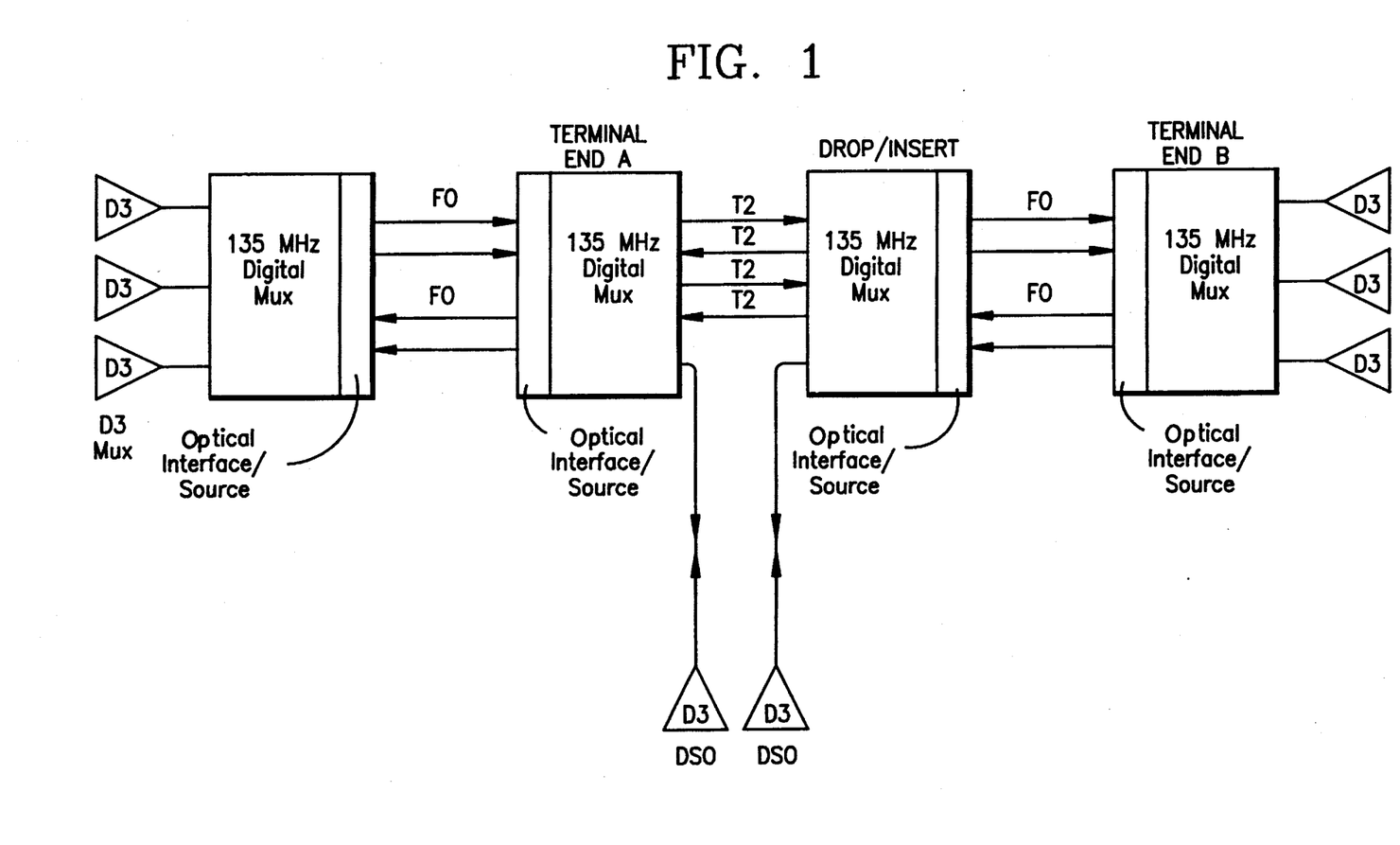
FIG. 1 shows a prior art communication system.

The above approach has a number of disadvantages. European protocol differs from U.S. protocol. Thirty-two DS0 signals are combined by a E1 multiplexer, the European counterpart of T1. Thirty of the 32 E1 channels transmit DS0 signals while the other two channels are used for signaling and alarm/supervision purposes. In general, European and U.S. standard telemetry is not mixed. The byte rates and formats differ. Likewise, while DS3 and synchronous optical network (SONET) formats may be combined in the same transmission facility, the DS3 is limited to non-drop/insert applications. In other words, such arrangements make it difficult to drop out signals and insert signals at intermediate ends of the transmission path. In such cases, at a point further down the facility, a portion of the signals are separated and diverted from the cable, while the remainder plus some additional information inserted at the same location continues to propagate along the cable. However, at such points, the multiplexed signal must be electronically broken down into basic DS3, DS2, DS1, DS0, ATM wideband and fractional wideband data operating at DS3 and SONET rate, sorted, and recombined. This requires significant quantities of electronics including both a digital demultiplexer, one or more multiplexers, and microprocessors as illustrated in the prior art FIG. 1.

U.S. Pat. No. 4,477,723, issued Oct. 16, 1984 to Edward F. Carome and the present inventor, hereby incorporated by reference, discloses a technique of using phase modulation to detect electric fields. An interferometer configuration is used.

The present inventor's prior U.S. Pat. No. 4,755,668, issued Jul. 5, 1988, and hereby incorporated by reference, discloses phase modulation interferometer techniques for use with a plurality of sensors.

The following patents disclose various other phase modulation techniques for use with telecommunications and/or sensors:

| Patent No. | Inventor |
| --- | --- |
| 4,699,513 | Brooks et al |
| 4,848,906 | Layton |
| 4,860,279 | Falk et al |
| 4,866,698 | Huggins et al |
| 4,882,775 | Coleman |
| 5,191,614 | LeCong |
| 5,223,967 | Udd |

Although the above and other techniques have been generally useful, they have often been subject to one or more disadvantages. For example, the capacity to carry a large number of signals within a single transmission path, such as optical fiber, is often limited. In some techniques, drop/insert operations (picking off a signal and inserting another signal) at an intermediate stage in a transmission path require complex electronics. Some techniques provide questionable security for transmission of telecommunications such as audio, video, and/or data. Some techniques do not readily or easily provide full duplex transmission within a single fiber. Some prior techniques don't readily allow redundant transmissions.

OBJECTS AND SUMMARY OF THE INVENTION

Accordingly, it is a primary object of the present invention to provide a new and improved optical telecommunication system.

A more specific object of the present invention is to provide an optical telecommunication system with a high capacity.

A further object of the present invention is to provide an optical telecommunication system with an improved technique for signal recovery.

Yet another object of the present invention is to provide an optical telecommunication system avoiding or minimizing the disadvantages discussed above with respect to various prior techniques and where optical paths, such as optical fibers, have more utility than simply serving as dumb links.

The above and other features of the present invention which will be more readily understood when the following detailed description is considered in conjunction with the accompanying drawings are realized by an optical telecommunication system having a first transmission unit operably connected to a first receiver unit by a transmission path having a first end adjacent the first transmission unit and a second end adjacent the first receiver unit. The first transmission unit has a source of radiant energy with a coherence length. The first transmission unit further includes separate first and second optical paths having a path length difference of $\Delta L_1$ which is greater than the coherence length, and means for dividing radiant energy from the source into first and second portions for passage respectively along the first and second paths and for recombining the first and second portions after passage along the first and second paths. For purposes of simplicity, the first and second paths as used herein will refer to first and second paths in the transmission unit. The first transmission unit further includes a phase modulator in the first optical path operable for applying a telecommunication signal to the first portion. The first receiver unit has separate first and second reception paths, each having a Faraday rotating mirror at an end to reflect back radiant energy, and means for reseparating the first and second portions for passage separately and respectively on the first and second reception paths and for recombining the first and second portions. The first receiver unit further includes a first sensor connected to the means for reseparating and recombining, the first sensor operable to sense radiant energy for detection of the telecommunications signal applied at the first transmission unit. The first transmission unit and the first receiver unit collectively are an interferometer.

In one embodiment, the means for dividing and recombining and the first and second paths are part of a Mach-Zehnder configuration. For that embodiment, the means for dividing and for recombining includes a splitter connected to split the radiant energy into the first and second portions and a coupler to combine the first and second portions.

In an alternate embodiment, the means for dividing and for recombining and the first and second paths are part of a Michelson configuration. The means for dividing and for recombining in this configuration is a coupler/splitter.

The first and second optical paths may be optical fibers or channel waveguides.

The source may be a laser or a superluminescent diode (type of light-emitting diode).

In a specific aspect of the invention, the means for reseparating and for recombining is a 4 by 4 (4×4) coupler/splitter (accommodates four paths on each of two sides) having a first side for initial entry of the first and second portions together and a second side. The first and second reception paths are connected directly to the second side. The first sensor is connected directly to the first side of the coupler/splitter by a first sensor path. The first receiver unit includes a second sensor operable to sense radiant energy for detection of the telecommunication signal applied at the first transmission unit, the second sensor being connected directly to the first side of the coupler/splitter by a second sensor path.

The present invention may alternately be described as an optical telecommunication system including a first receiver unit as described above. The first and second sensors of the receiver unit are connected to a demodulation or recovery system. The demodulation system includes first and second differentiators connected to respectively differentiate first and second input signals derived from the first and second sensors and provide respective first and second differentiated signals. The demodulation system further includes first and second multipliers operably connected to the first and second differentiators. The first multiplier is connected to form a first product of the first input signal and the second differentiated signal, whereas the second multiplier is connected to form a second product of the second input signal and the first differentiated signal. (The products as used herein may be the two signals multiplied together or the negative of the two signals multiplied together.) A product combining means for combining (addition or subtraction as used herein) the first and second products is used in the demodulation system. The demodulation system further includes an integrator connected to integrate an output of the product combining means and to provide a recovered version of the telecommunication signal. Note that the integrator and other components of the demodulation system may be hardware elements or, alternately, different components within a software demodulation system.

The present invention may alternately be described as an optical telecommunication system having a source of radiant energy with a coherence length and a first transmission unit as described above except that the source is not part of the transmission unit. The system further includes a transmission path connecting the first transmission unit to a first receiver unit. The first receiver unit is connected to a second end of the transmission path, whereas the first transmitter unit is connected to a first end of the transmission path. The first receiver unit includes separate first and second reception paths, each having an end which reflects back radiant energy. The first receiver unit further includes a means for reseparating the first and second portions for passage separately and respectively on the first and second reception paths and for recombining the first and second portions and a first sensor connected to the means for reseparating and recombining, the first sensor operable to sense radiant energy for recovery of the telecommunication signal applied at the first transmission unit. The first transmission unit and the first receiver unit collectively are an interferometer. The means for reseparating and recombining is a 4 by 4 coupler/splitter having a first side closest to the second end of the transmission path and a second side. The first and second reception paths are connected directly to the second side. The first sensor is connected directly to the first side by a first sensor path. The first receiver unit further includes a second sensor operable to sense radiant energy for recovery of the telecommunications signal applied at the first transmission unit. The second sensor is connected directly to the first side of the coupler/splitter by a second sensor path.

In one embodiment of the invention described immediately above, a second transmission unit constructed in like fashion as the first transmission unit is included in the system. The system further includes a transmission splitter connected to split radiant energy from the source into portions directed separately to the first and second transmission units and a transmission coupler connected to combine radiant energy which is passed through the first and second transmission units and which is connected to the transmission path. A second receiver unit constructed in like fashion as the first receiver unit is operably connected to the second end of the transmission path. The first and second receiver units respectively recover signals applied to the first and second transmitter units.

In another embodiment of the invention, a second transmission unit is connected at the second end of the transmission path and a second receiver unit is connected at the first end of the transmission path. The first and second receiver units respectively recover signals applied to the first and second transmitter units such that full duplex communication is provided.

In a drop/insert embodiment of the present invention, an intermediate station is provided in the telecommunication system. The intermediate station is on the transmission path between the first and second ends. The intermediate station includes a second transmission unit operably connected to an intermediate location of the transmission path and a second receiver unit operably connected to an intermediate location of the transmission path.

The present invention may alternately be described as an optical telecommunication system comprising a first receiver unit as recited above.

The present invention may alternately be described as an optical telecommunication system having a recovery system as described in detail above.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 2:
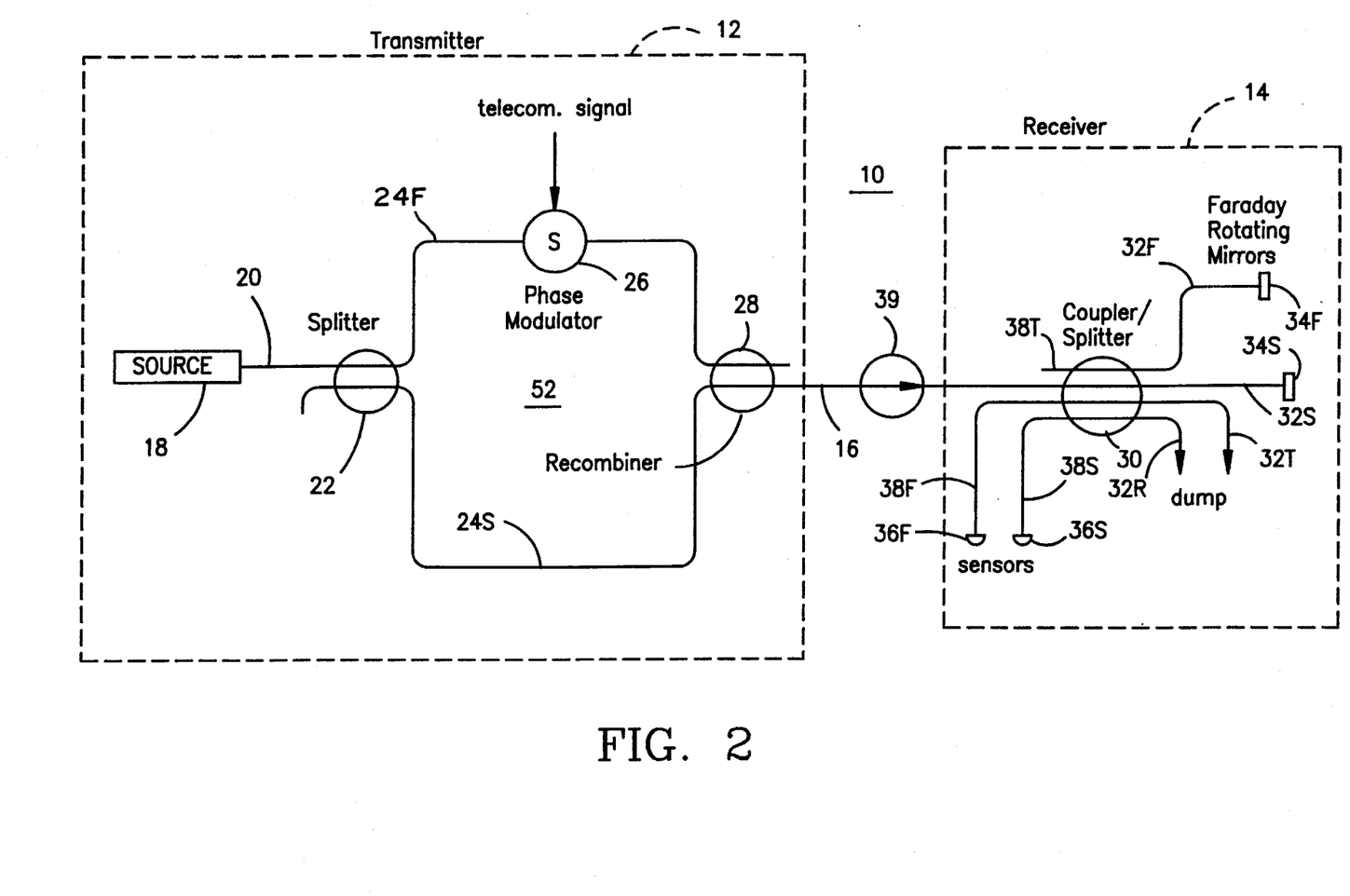
FIG. 2 shows a schematic of a first embodiment telecommunication system according to the present invention.

Turning now to FIG. 2, a first embodiment optical telecommunications system 10 according to the present invention is shown as including a transmitter unit 12 connected to a receiver unit 14 by way of a transmission path 16, which is shown as an optical fiber.

The transmitter unit 12 includes a source 18 of radiant energy connected by source path 20 (which may be either an optical fiber or a channel waveguide) to a coupler/splitter 22. As used hereafter, a coupler/splitter will generally be referred to as a splitter if used for splitting signals, a coupler if used for coupling signals, and a coupler/splitter if used for both coupling and splitting signals. The splitter 22 divides radiant energy from the source 18 into first and second portions which respectively travel down first and second optical paths 24F and 24S. Optical path 24F has a phase modulator 26 for applying a telecommunication signal to the first portion of radiant energy passing through optical path 24F. The optical paths 24F and 24S may be optical fibers or channel waveguides. The first and second portions of radiant energy traveling respectively along paths 24F and 24S are recombined by coupler 28.

The configuration for transmitter unit 12 will be recognized as that of a Mach-Zehnder interferometer. However, instead of having a path length difference $\Delta L_1$ which is less than the coherence length of the source 18 such that an interference pattern is produced at the output (right side) of coupler 28, transmitter unit 12 is structured so that the path length difference $\Delta L_1$ is at least two times (preferably more) the coherence length of the source 18. Therefore, the output of coupler 28 applied to the transmission path 16 is not an interference pattern, but is two signals corresponding to the first and second portions of radiant energy. Transmission unit 12 will be referred to as having a Mach-Zehnder configuration.

The splitter 22 and coupler 28 collectively serve as a means for dividing and for recombining the radiant energy from the source 18 into the first and second portions.

The optical phase modulator 26 may be an integrated electro-optic, electrostrictive, or acousto-optic device. Phase modulator 26 together with optical paths 24F and 24S (constructed as channel waveguides), source 18, source path 20, splitter 22, and coupler 28 may all be part of an electro-optic chip. In that case, the source 18 would preferably be a superluminescent diode. Where the paths 24F and 24S are realized by optical fibers, the source 18 would usually be a low coherence length single mode laser.

The signals on transmission path 16 enter into a first side of a 4 by 4 coupler/splitter 30 within receiver unit 14. At the second side (right side in FIG. 2) of coupler/splitter 30, light is supplied to four different optical reception paths 32F, 32S, 32T, and 32R. As shown, the optical fibers of paths 32T and 32R will be dumped by having their ends painted with non-reflective coatings or being placed in index matching media. Alternately, the fiber may be wound in such a manner as to greatly increase the attenuation, thereby minimizing reflection. If the amount of energy reflected is very low, it may be unnecessary to use any reflection suppressing methods. At any rate, the signals on those two paths 32T and 32R are ignored.

The optical signals on optical fibers corresponding to paths 32F and 32S are supplied respectively to first and second Faraday rotating mirrors 34F and 34S. Before describing in detail the effect of the Faraday rotating mirrors, some background information may be useful.

When conventional telecommunications optical fiber is employed in the fabrication of fiber-optic interferometers, mechanical and thermal fluctuations lead to random fluctuations in the optical state of polarization (SOP) of the light propagating through the optical fiber. These, in turn, result in variations, or fading in the output fringe visibility. Such fading can lead to a complete loss of signal. One approach to overcoming such effects is to employ polarization preserving optical fiber throughout the system, but this significantly increases the cost and complexity of the system.

Recently, a completely passive technique for producing polarization-insensitive operation has been demonstrated for use with fiber-optic interferometers where the light retraces its path (e.g., 2 by 2 Michelsons or modified Michelson configurations as shown in FIG. 2). In such interferometers, the round trip time of flight of the light is many orders of magnitude shorter than the time associated with changes in mechanical and thermal strains responsible for polarization fluctuations. Thus, with respect to the light propagating to and from the distal end of the fiber, these polarization fluctuations are essentially constant. At the distal end, a so called Faraday rotating mirror is used to rotate the state of polarization of the light by 45° before it reaches the mirror. Such Faraday rotating mirrors are attached to the distal ends of the fibers in each arm of the interferometer. These elements result in a net 90° rotation of the state of polarization of the light that makes a double pass through the Faraday rotating mirror. In such an arrangement, the polarization fluctuation in the light propagating in one direction is essentially unwound as the light propagates back in the other direction. This results in a state of polarization in the light returning to a beam splitter after reflection from the Faraday rotating mirror, which state is independent of the arm. The returning light in both arms of the interferometer will have the same state of polarization. Since the state of polarization of the light in each arm is the same, the visibility is constant. This results in a polarization-insensitive interferometer. A polarizer may be used at the transmitter prior to the phase modulator in order to insure proper modulation at the phase modulator.

Turning now from the general discussion of Faraday rotating mirrors to the specific arrangement of the receiver unit 14 of FIG. 2, the Faraday rotating mirrors 34F and 34S are used to eliminate polarization effects. (If polarization is not a problem in certain receiver units, components 34F and 34S could be regular mirrors.)

The configuration of receiver unit 14 is a modification of a Michelson interferometer configuration. It allows the recovery of the phase modulation which was proportional to the amplitude of the electrical signal applied to phase modulator 26 at the transmitter unit. In order to recover that telecommunications signal, first and second sensors 36F and 36S connected to the coupler/splitter 30 by way of respective corresponding first and second sensor paths 38F and 38S, which may, like paths 32F, 32S, 32T, and 32R, be optical fibers or channel waveguides.

The path length difference between paths 32F and 32S is $\Delta L_1$, the same as the path length difference between paths 24F and 24S. Note that the path length difference between paths 32F and 32S depends upon a round trip of the light along those paths. That portion of light from source 18 which passed through the longer of paths 24F and 24S is divided by coupler/splitter 30 such that a portion of it passes along the shorter of paths 32F and 32S. That portion of light from source 18 which passed through the shorter of paths 24F and 24S is divided by coupler/splitter 30 and a portion of it passes along the longer of the paths 32F and 32S. The rays of light which pass through the long arm of transmitter 12 and the short arm or path of receiver unit 14 travel the same distance as light rays which pass through the short arm of the transmitter unit 12 and the long arm or path of receiver unit 14. Accordingly, the light applied to sensor paths 38F and 38S will have an interference pattern dependent upon the phase modulation introduced by phase modulator 26, thus corresponding to the telecommunication signal.

The advantage of using the 4 by 4 coupler/splitter at the receiver unit 14 to form what is essentially a modified Michelson interferometer configuration is to allow easy demodulation of the telecommunication signal. The signals exiting along first and second sensor paths 38F and 38S have amplitude modulations proportional to the telecommunication signal applied at the transmitter unit 12 and have relative phase offsets equal to integral multiples of 90° with respect to each other. Sensor paths 38F and 38S are chosen to have relative phase offsets of 90° with respect to each other. Although path 38T is not shown connected to anything, one could additionally have it connected to a third sensor and use an automatic control circuit (not shown) to indicate which two of the three such sensors would have a 90° offset. Further, the third sensor might be used for other functions, such as combining its signal with a 180° out of phase signal to provide a level adjustment feature or other such features.

Figure 3:
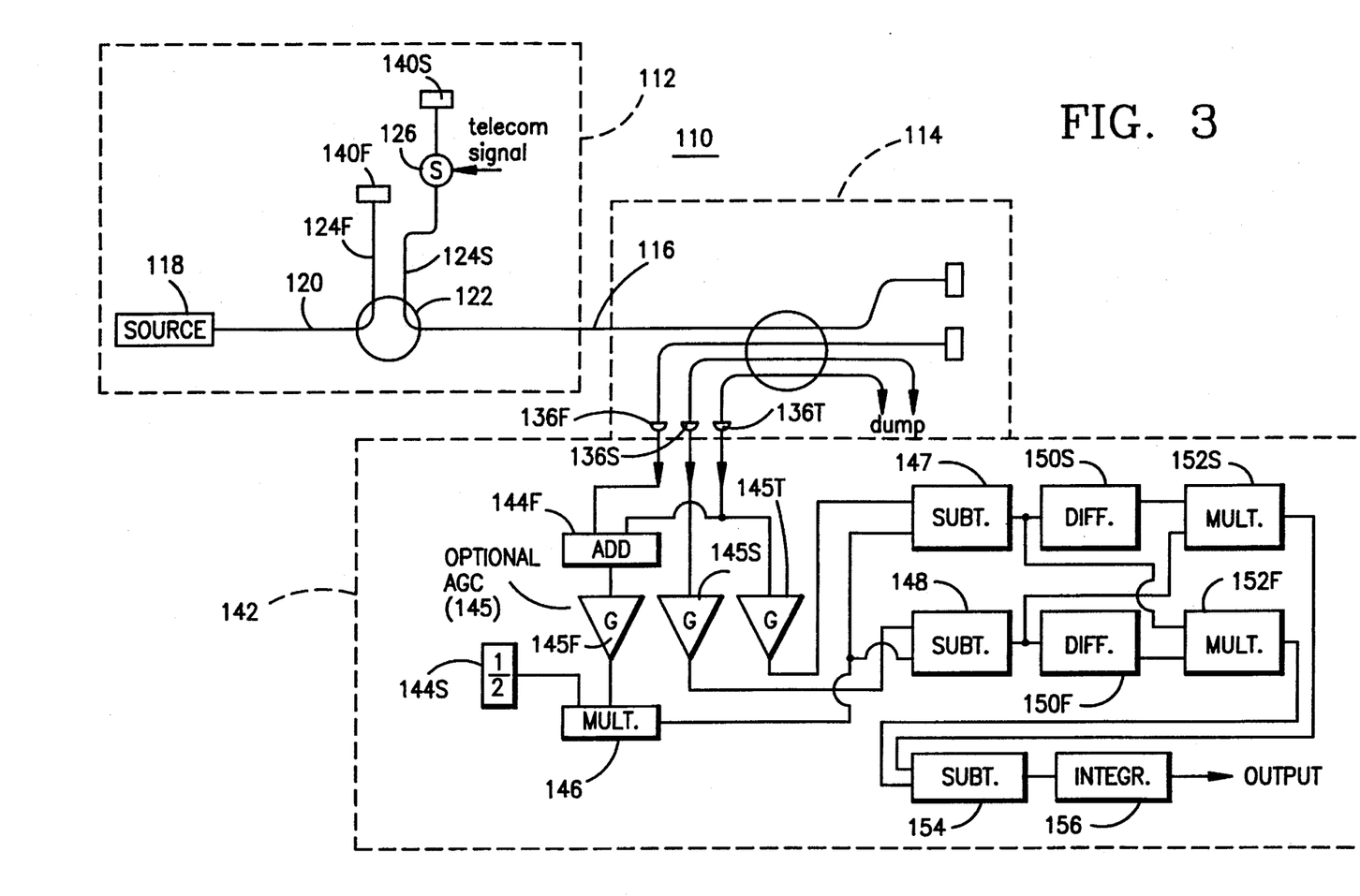
FIG. 3 shows a second embodiment telecommunication system according to the present invention combined with a block diagram of a recovery system portion of the telecommunications system.

The sensors 36F and 36S, which may be photodetectors, convert the light into electrical signals and feed the light into a demodulation system, not shown in FIG. 2, which is discussed in detail with respect to FIG. 3.

An optical isolator 39, which allows light to pass in one direction only, is used to block light from traveling out of receiving unit. Although not shown in the other embodiments, such an isolator may be used with each receiving unit discussed below, especially in the duplex arrangements.

Turning now to an alternate embodiment of FIG. 3, the components are in the 100 series with the same last two digits as the corresponding component, if any, in the embodiment of FIG. 2. Thus, the telecommunication system 110 of FIG. 3 includes a transmitter unit 112 connected by transmission path 116 (which may be an optical fiber) to a receiver unit 114. As the receiver unit 114 is identical in structure to receiver unit 14 of FIG. 2, it need not be discussed in detail.

The transmitter unit 112 is different from transmitter unit 12 of FIG. 2. Specifically, the transmitter unit 112 has a Michelson interferometer configuration. A source 118 provides radiant energy to path 120 and into coupler/splitter 122 which divides the light into portions which travel down the different arms or optical paths 124F and 124S. As with paths 24F and 24S of FIG. 2, the paths 124F and 124S have a path length difference $\Delta L_1$ (takes into account round trip of the light) which is at least twice the coherence length of the source 118. First and second reflectors 140F and 140S reflect back light energy from the ends of the optical paths 124F and 124S. A phase modulator 126 allows introduction of a telecommunication signal to the light passing there through. The construction of source 118, phase modulator 126, and the various optical paths within transmitter unit 112 may include the various alternatives as discussed with respect to the corresponding components in the FIG. 2 embodiment.

The transmitter unit 112 provides light which may relatively securely pass along transmission path 116. In particular, the signal cannot be directly detected, this also being true of the FIG. 2 and other embodiments discussed herein. The light placed on transmission path 116 by coupler/splitter 122 has the same characteristics as the light placed on transmission path 16 of FIG. 2.

As discussed, the receiver unit 114 is identical to receiver unit 14 of FIG. 2. However, FIG. 3 shows a recovery or demodulator system 142 which would be connected to recover or demodulate the electrical signals supplied by first and second sensors 136F and 136S and a third sensor 136T.

Signals from photodiodes (sensors) 136F, 136S, and 136T may be expressed as $I_1$, $I_2$, and $I_3$, respectively, where $$I_1 = I_0[1+V \cos \Theta] = I_0 + I_0 V \cos \Theta \quad (1)$$

$$I_2 = I_0[1+V \cos (\Theta+\pi/2)] = I_0 - I_0 V \sin \Theta \quad (2)$$

$$I_3 = I_0[1+V \cos (\Theta+\pi)] = I_0 - I_0 V \cos \Theta \quad (3)$$

and $I_0$ is the average light intensity, V is the visibility, and $\Theta$ is the telecommunication signal to be demodulated (applied to modulator 126).

Adding $I_1$ and $I_3$ (at adder 144F) gives $2I_0$. Multiplying this by ½ (from source 144S) yields $I_0$ out of multiplier 146. Optional automatic gain control (AGC) circuits 145F, 145S, and 145T may be used to scale the signal voltages (with a gain G) such that average signal levels out of 145F, 145S, and 145T are maintained at some convenient value, such as 5 V. In any case, the output of multiplier 146 is a signal equal to $I_0$. Subtracting $I_0$ from $I_2$ at subtractor 147, and $I_0$ from $I_3$ at subtractor 148 yields the new signals $$I_2 - I_0 = -I_0 V \sin \Theta \quad (4)$$

$$I_3 - I_0 = I_0 V \cos \Theta \quad (5)$$

The signals of equations (4) and (5) are respectively supplied to differentiators 150F and 150S. After differentiation by differentiators 150F and 150S, the respective outputs of the differentiators are as shown in equations 6 and 7 below where the primes indicate differentiation with respect to time:

$$\text{output of } 150F = -I_0 V \Theta' \cos \Theta \quad (6)$$

$$\text{output of } 150S = I_0 V \Theta' \sin \Theta \quad (7)$$

A first multiplier 152F multiplies the signal of equation 4 by the differential signal of equation 7, whereas a second multiplier 152S takes the product of equations 5 and 6. These two products are supplied to the subtractor 154 which subtracts the product from multiplier 152F from the product of multiplier 152S. The subtractor 154 is essentially adding the quantities after it removes the negative sign from the quantity of the product from multiplier 152F. The output of subtractor 154 is given by equation 8 below which readily simplifies using a common trig identity:

$$\text{output} = (I_0 V)^2 \Theta'(\cos^2\Theta + \sin^2\Theta) = (I_0 V)^2 \Theta' \qquad (8)$$

The output from subtractor 154 is fed to integrator 156 which recovers the signal $(I_0 V)^2 \Theta$, a result proportional to the telecommunication signal introduced at phase modulator 126. The ability to obtain or demodulate this signal using the present technique is based on the fact that the electrical signals generated by sensors 136S and 136T will be 90° out of phase as are the optical signals striking those two sensors.

Only two of the sensors, such as photodiodes 136F, 136S, and 136T, need be used in the demodulator 142 provided that they have signals 90° out of phase.

Advantageously, the demodulator 142 of FIG. 3 allows direct demodulation of the telecommunication signal without the use of either a phase-generated carrier (PGC) or a phase-locked-loop (PLL) approach. This direct demodulation approach has considerable advantage over the PGC and PLL approaches when demodulating high-frequency telecommunication signals. In the case of the PGC approach, the carrier frequency must be 5 to 10 times higher than the highest signal frequency. This significantly limits the intelligence bandwidth and reduces the number of individual signals that may be multiplexed on a fiber transmission link. In the case of the PLL approach, the requirement for feedback ultimately introduces a reset pulse which will corrupt the intelligence.

Figure 4:
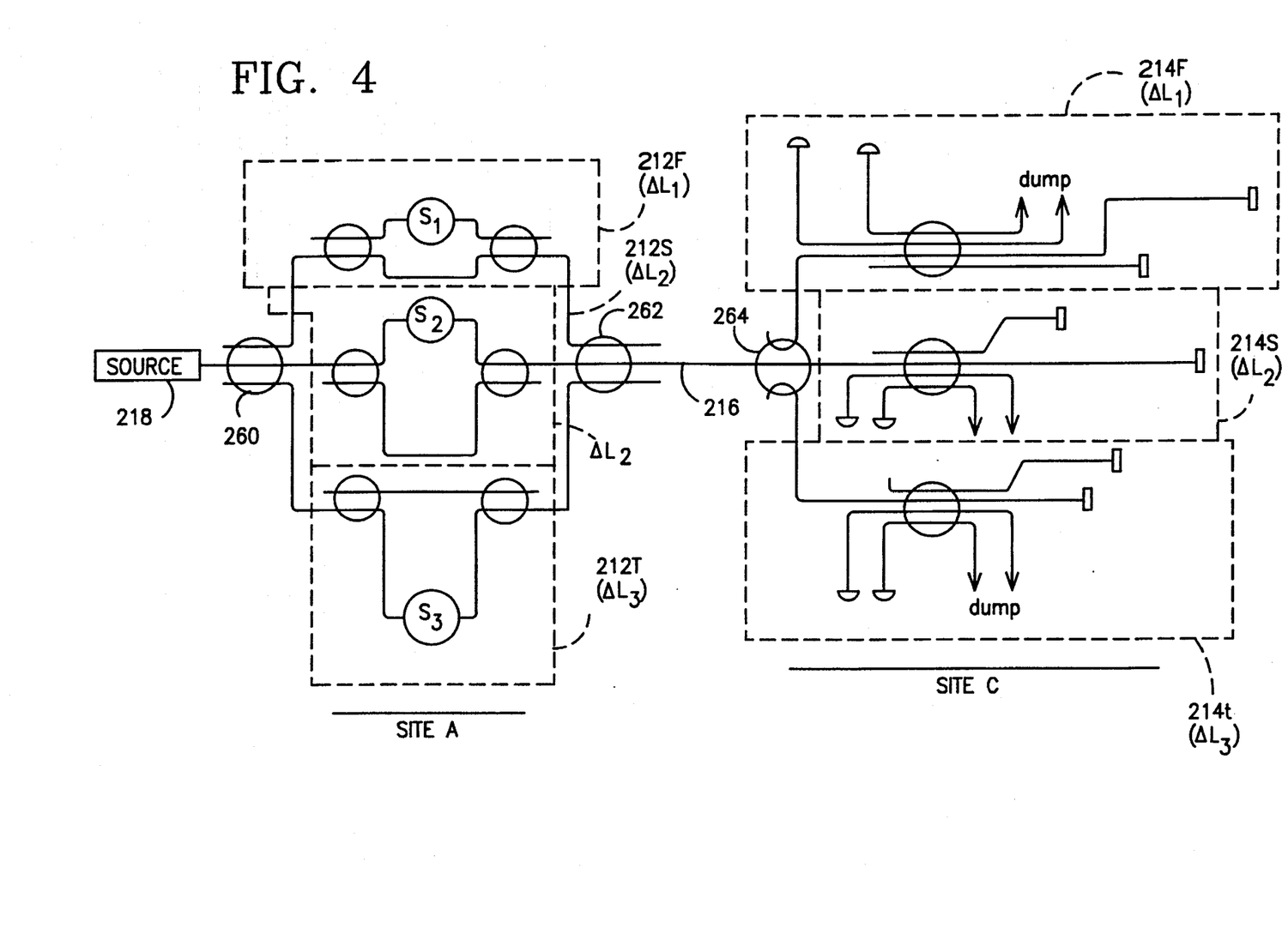
FIG. 4 shows a third embodiment telecommunication system according to the present invention in which multiple transmitters are at one end and multiple receivers are at another end.

Turning now to FIG. 4, an arrangement for multiplexing a plurality of signals at site A on transmission line 216 and demultiplexing the signals at site C is shown. The components in FIG. 4 are numbered in the 200 series and have the same last two digits as the corresponding component, if any, in the FIG. 2 embodiment. Radiant energy from source 218 is split three ways by the 1 by 3 splitter 260. The light from splitter 260 is split in three different portions supplied to corresponding first, second, and third transmission units 212F, 212S and 212T. Each of the transmission units 212F, 212S, and 212T is constructed in the same fashion as transmission unit 12 of FIG. 2 except that the transmission units of FIG. 4 do not have a source of radiant energy, but instead receive a portion of the radiant energy from source 218 by way of the splitter 260. Each of the transmission units 212F, 212S, and 212T will be recognized as having a Mach-Zehnder configuration. The transmission units 212F, 212S, and 212T are identical except that they have respective path length differences of $\Delta L_1$, $\Delta L_2$, and $\Delta L_3$, which are shown in parentheses below the numerals for the corresponding transmission unit. The respective path length differences are sufficiently different from each other that each of the transmission units may apply a signal to the transmission path 216 by way of the coupler 262, but without the various signals interfering with each other. As in the arrangements of FIGS. 2 and 3, the path length differences should be at least twice the coherence length of the source 218. However, as with the other embodiments, it may be sufficient for the path length differences to simply be greater than the coherence length of the source 218.

The transmission units 212F, 212S, and 212T may use channel waveguides upon a single electro-optic chip (not separately shown). Although the transmission units are shown as Mach-Zehnder configuration units, they alternately could be Michelson configurations.

The signals sent from site A along transmission path 216 are split by a three way splitter 264 at site C for passage into first, second, and third receiver units 214F, 214S, and 214T. Each of the receiver units are constructed in like fashion to receiver unit 14 of FIG. 2. However, units 214F, 214S, and 214T have respective path length differences of $\Delta L_1$, $\Delta L_2$, and $\Delta L_3$ as indicated parenthetically below the numerals of the corresponding receiver unit. Accordingly, each of the receiver units 214F, 214S, and 214T is used for detecting signals from the corresponding one of the transmission units at site A.

Although specific telecommunication signals are not shown applied to the phase modulators of the transmission units 212F, 212S, and 212T and for the embodiments discussed below, such signals would be applied to the various phase modulators in those transmission units. The signals applied may be the output of multiplexers or other devices having analog or time division multiplexed signals of varying protocols. These may be mixed in any combination.

Although not shown in FIG. 4, three recovery or demodulator circuits similar to 142 of FIG. 3 would be used corresponding to each of the three receiver units in the FIG. 4 embodiment. Such demodulator circuits or systems would be used for any of the embodiments discussed herein.

Figure 5:
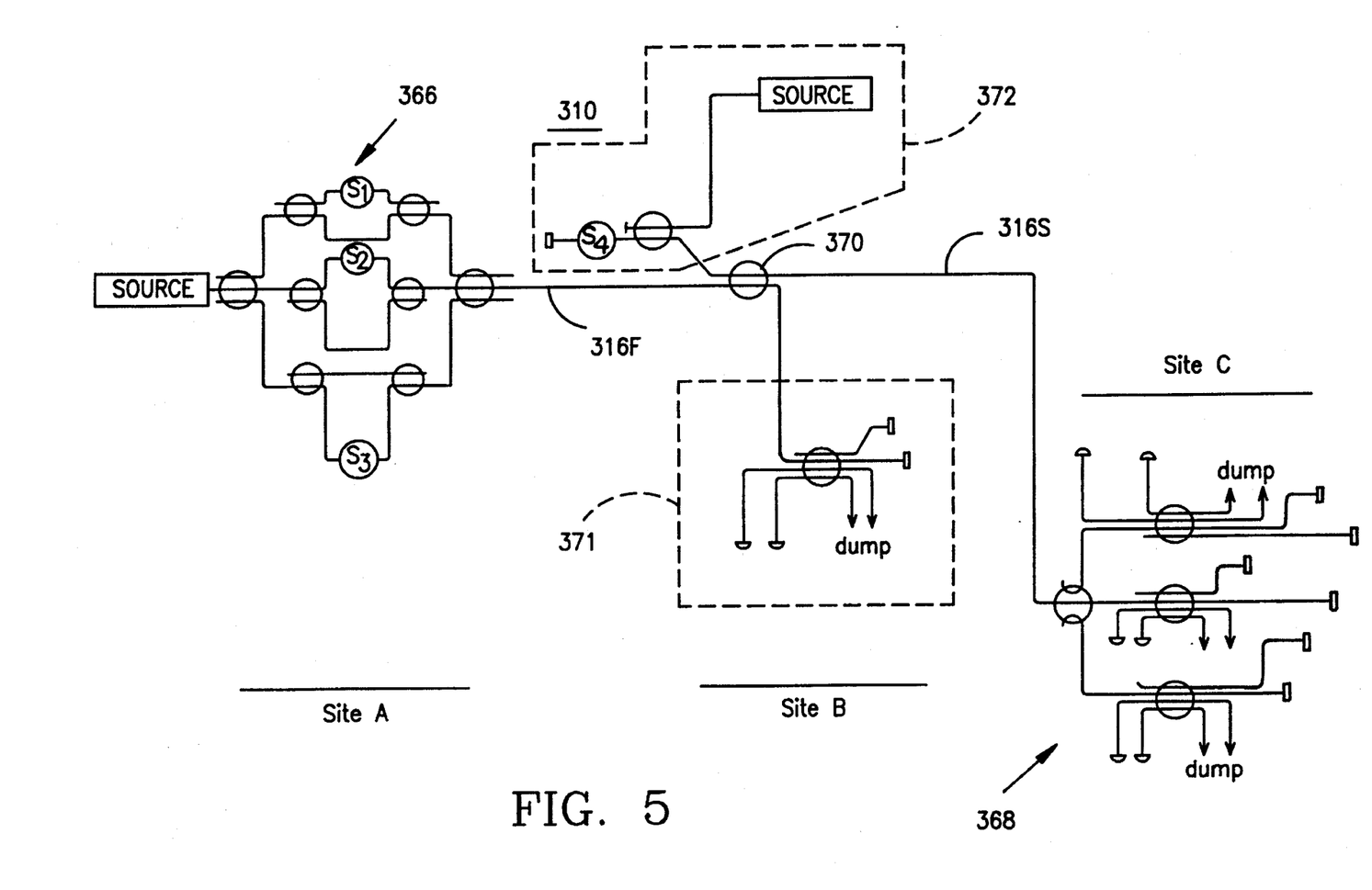
FIG. 5 shows a fourth embodiment telecommunication system according to the present invention wherein a drop/insert technique is obtained by use of an intermediate station.

Turning now to FIG. 5, a drop/insert configuration for the present invention is shown with components numbered in the 300 series with the same last two digits as the corresponding component, if any, of the FIG. 2 embodiment. The telecommunication system 310 of FIG. 5 includes a transmitter system 366 at site A and a receiver system 368 at site C which are identical respectively to the structures at sites A and C in the FIG. 4 embodiment. Therefore, these components need not be discussed in detail. The transmission path between site A and site B includes first and second portions 316F and 316S attached by a coupler/splitter 370. The 2 by 2 coupler/splitter 370 has one output port connected to the transmission path, such as optical fiber, 316S. Its other output port is connected to a modified Michelson receiver unit 371 (constructed and operational as described with respect to receiver unit 14 of FIG. 2). Unit 371 has a path length difference matching one of the transmitter units at transmitter system 366, site A and will detect signals therefrom. One of the input ports of coupler/splitter 370 is connected to transmission path 316F, whereas the other input port is connected to a transmitter unit 372, constructed and operational as described with respect to transmitter unit 112 of FIG. 3. In place of the Michelson configuration transmitter unit 372, a Mach-Zehnder transmitter unit could be used at the intermediate location corresponding to site B. In either case, the signals applied by transmitter unit 372 pass along transmission path 316S to site C where detection and demodulation may occur by use of a receiver unit having a path length difference corresponding to the path length difference of unit 372.

Figure 6:
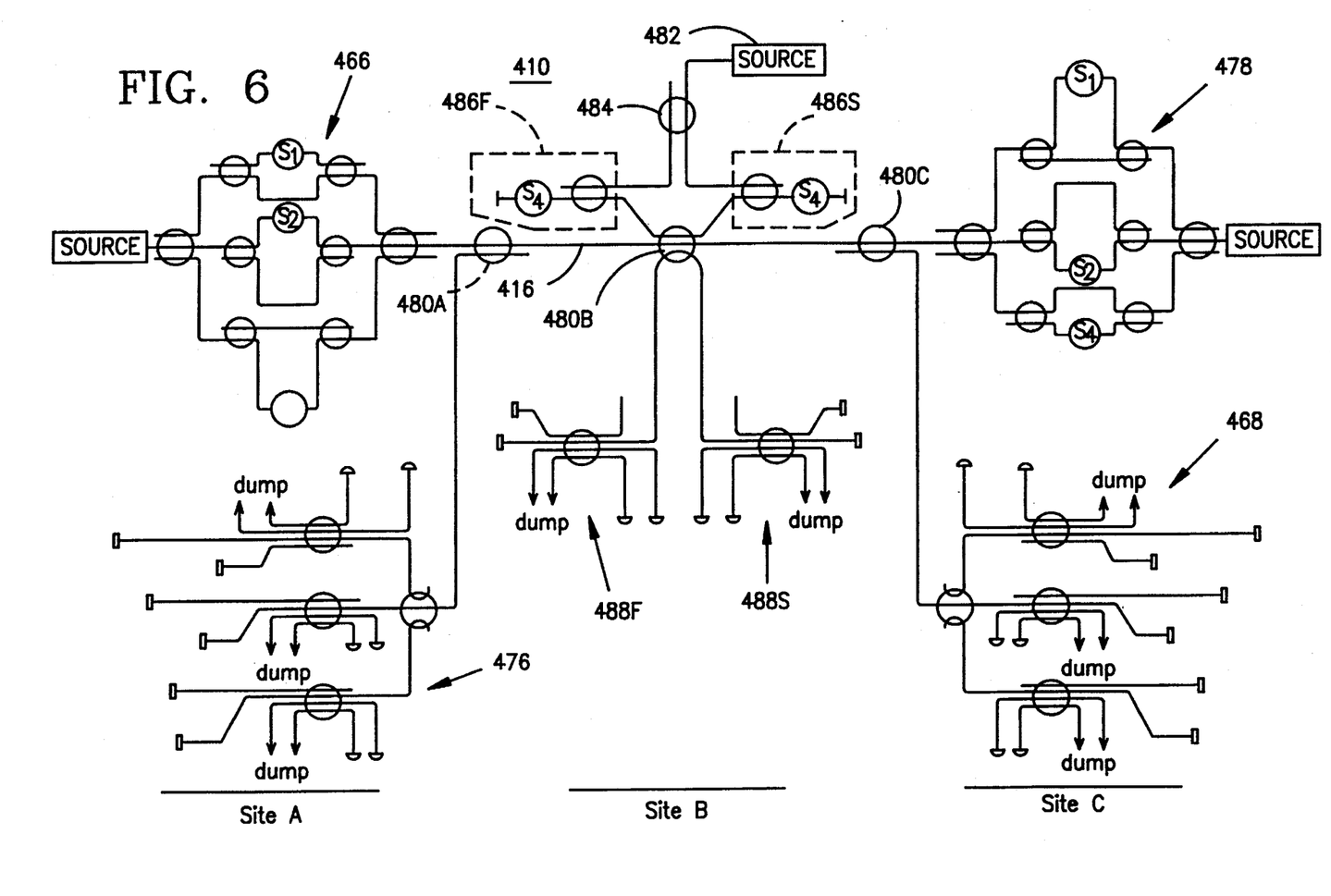
FIG. 6 shows a fifth embodiment telecommunication system according to the present invention which provides full duplex transmission and a drop/insert capability at an intermediate station.

Turning now to FIG. 6, a full duplex communication system incorporating a drop/insert multiplexer is shown. The optical telecommunication system 410 of FIG. 6 has numbers in the 400 series with the same last two digits as the corresponding component, if any, from one or more of the previous embodiments.

A multiplexed arrangement of three transmission units 466 at site A and a multiplexed arrangement 468 of three receiver units at site C are constructed and operational as discussed with respect to corresponding components 366 and 368 of FIG. 5. However, since the FIG. 6 arrangement is full duplex, site A also includes an assembly 476 of three multiplexed receiver units, constructed and operational in the same fashion as receiver system 468 and 368 described previously. Likewise, site C includes a transmission system 478 which has three multiplexed transmitter units and is constructed and operational as discussed with respect to transmitter system 466 and 366. At site A, a coupler/splitter 480A directs communications sent to site A from site B or C towards the receiver system 476 and allows outgoing signals from transmitter system 466 to be applied to a transmission path 416. Coupler/splitter 480C performs the same function at site C.

Site B, located intermediate sites A and C has a 3 by 3 coupler/splitter 480B. (The sites would, as always, be at different locations from each other.) A source 482 provides radiant energy to an associated splitter 484 which supplies first and second Michelson configuration transmission units 486F and 486S. The transmission units 486F and 486S, operate in identical fashion to transmission unit 112 described in detail with respect to FIG. 2. The output from the transmission units is applied to the transmission path 416 by way of the coupler/splitter 480B.

Signals intended for site B may be detected by first and second modified Michelson configuration receiver units 488F and 488S, each of which is constructed and operational in similar fashion to that described for reception unit 14 of FIG. 2. Receiver 488F is used to receive signals sent by site C, whereas receiver 488S is used to receive signals sent by site A.

The transmitter unit 486F is used to send signals to site C, whereas transmitter unit 486S is used to send signals to site A. As will be readily understood, the path length difference in a particular receiving unit should match the path length difference in the corresponding transmitter unit.

Although specific constructions and embodiments have been presented herein, these are for illustrative purposes only. Various modifications will be apparent to those of skill in the art. Accordingly, the scope of the present invention will be determined by reference to the claims appended hereto.

What is claimed is:

1. An optical telecommunication system comprising:
    a first transmission unit having:
        a source of radiant energy having a coherence length;
        separate first and second optical paths having a path length difference of $\Delta L_1$ which is greater than said coherence length;
        means for dividing radiant energy from said source into first and second portions for passage respectively along said first and second optical paths and for recombining said first and second optical portions after passage along said first and second optical paths;
        a phase modulator in said first optical path operable for applying a telecommunication signal to said first portion;
    said first transmission unit operably connected to provide said recombined portions with a phase difference corresponding to $\Delta L_1$ to a transmission path having a first end adjacent said first transmission unit and a second end; and
    a first receiver unit operably connected to said second end of said transmission path and having:
        separate first and second reception paths, each having a Faraday rotating mirror at an end to reflect back radiant energy;
        means for reseparating said first and second portions for passage separately and respectively on said first and second reception paths and for recombining said first and second portions; and
        a first sensor connected to said means for reseparating and recombining, said first sensor operable to sense radiant energy for detection of the telecommunication signal applied at the first transmission unit; and
    wherein said first transmission unit, transmission path, and said first receiver unit collectively are an interferometer.

2. The optical telecommunication system of claim 1 wherein said means for dividing and for recombining and said first and second optical paths are part of a Mach-Zehnder configuration.

3. The optical telecommunication system of claim 1 wherein said means for dividing and for recombining comprises a splitter connected to split the radiant energy into the first and second portions and a coupler to combine the first and second portions.

4. The optical telecommunication system of claim 1 said means for dividing and for recombining and said first and second optical paths are part of a Michelson configuration.

5. The optical telecommunication system of claim 4 said means for dividing and for recombining comprises a coupler/splitter.

6. The optical telecommunication system of claim 1 wherein said first and second optical paths are optical fibers.

7. The optical telecommunication system of claim 1 wherein said first and second optical paths are channel waveguides.

8. The optical telecommunication system of claim 1 wherein said source is a laser.

9. The optical telecommunication system of claim 1 wherein said source is a superluminescent diode.

10. The optical telecommunication system of claim 1 wherein said means for reseparating and for recombining is a 4 by 4 coupler/splitter having a first side for initial entry of said first and second portions together and a second side, said first and second reception paths connected directly to said second side, said first sensor connected directly to said first side of said coupler/splitter by a first sensor path, and said first receiver unit further comprises a second sensor operable to sense radiant energy for detection of the telecommunication signal applied at the first transmission unit, and wherein said second sensor is connected directly to said first side of said coupler/splitter by a second sensor path.

11. An optical telecommunication system comprising:
    a first receiver unit having:
        separate first and second reception paths, each having a Faraday rotating mirror at an end to reflect back radiant energy;
        a means for reseparating first and second portions of radiant energy for passage separately and respectively on said first and second reception paths and for recombining said first and second portions, said first and second portions having been combined after separation and passage on different paths with a path length difference of $\Delta L_1$, one of the paths having application of a telecommunication signal by phase modulation thereon;
        a first sensor connected to said means to reseparate and to recombine, said first sensor sensing radiant energy for detection of the telecommunication signal.

12. The optical telecommunication system of claim 11 wherein said means for reseparating and for recombining is a coupler/splitter.

13. The optical telecommunication system of claim 12 wherein said coupler/splitter is a 4 by 4 coupler/splitter having a first side for initial entry of said first and second portions together and a second side, said first and second reception paths connected directly to said second side, said first sensor connected directly to said first side of said coupler/splitter by a first sensor path, and said first receiver unit further comprises a second sensor operable to sense radiant energy for detection of the telecommunication signal applied at the first transmission unit, and wherein said second sensor is connected directly to said first side of said coupler/splitter by a second sensor path.

14. The optical telecommunication system of claim 13 wherein said first and second sensors are connected to a demodulation system, said demodulation system including:
   first and second differentiators connected to respectively differentiate first and second input signals derived from said first and second sensors and provide respective first and second differentiated signals;
   first and second multipliers operably connected to said first and second differentiators, said first multiplier connected to form a first product of said first input signal and said second differentiated signal, said second multiplier connected to form a second product of said second input signal and said first differentiated signal;
   product combining means for combining said first and second products; and an integrator connected to integrate an output of said product combining means and to provide a demodulated version of said telecommunication signal.

15. The optical telecommunication system of claim 14 further comprising:
   a first transmission unit having:
      a source of radiant energy having a coherence length;
      separate first and second optical paths having a path length difference of $\Delta L_1$ which is greater than said coherence length;
      means for dividing radiant energy from said source into said first and second portions for passage respectively along said first and second optical paths and for recombining said first and second two portions after passage along said first and second optical paths;
      a phase modulator in said first optical path operable for applying a telecommunication signal to said first portion; and
   wherein said first transmission unit is operably connected to provide said recombined portions with a phase difference corresponding to $\Delta L_1$ to a transmission path having a first end adjacent said first transmission unit and a second end adjacent said first receiver unit.

16. An optical telecommunication system comprising:
   a source of radiant energy having a coherence length;
   a first transmission unit having:
      separate first and second optical paths having a path length difference of $\Delta L_1$ which is greater than said coherence length;
      means for dividing radiant energy from said source into first and second portions for passage respectively along said first and second optical paths and for recombining said first and second two portions after passage along said first and second optical paths;
      a phase modulator in said first optical path operable for applying a telecommunication signal to said first portion;
   said first transmission unit operably connected to provide said recombined portions with a phase difference corresponding to $\Delta L_1$ to a transmission path having a first end adjacent said first transmission unit and a second end; and
   a first receiver unit operably connected to said second end of said transmission path and having:
      separate first and second reception paths, each having an end which reflects back radiant energy;
      means for reseparating said first and second portions for passage separately and respectively on said first and second reception paths and for recombining said first and second portions; and
      a first sensor connected to said means for reseparating and recombining, said first sensor operable to sense radiant energy for detection of the telecommunication signal applied at the first transmission unit; and
   said first transmission unit, said transmission path, and said first receiver unit collectively are an interferometer; and wherein said means for reseparating and recombining is a 4 by 4 coupler/splitter having a first side closest to said second end of said transmission path and a second side, said first and second reception paths connected directly to said second side, said first sensor connected directly to said first side of said coupler/splitter by a first sensor path, and said first receiver unit further comprises a second sensor operable to sense radiant energy for detection of the telecommunication signal applied at the first transmission unit, and wherein said second sensor is connected directly to said first side of said coupler/splitter by a second sensor path.

17. The optical telecommunication system of claim 16 further comprising a second transmission unit constructed in like fashion as said first transmission unit, a transmission splitter connected to split radiant energy from said source into portions directed separately to said first and second transmission units, a transmission coupler connected to combine radiant energy which has passed through said first and second transmission units and connected to said transmission path; and further comprising a second receiver unit constructed in like fashion as said first receiver unit and operably connected to said second end of said transmission path; and wherein said first and second receiver units respectively detect signals applied to said first and second transmitter units.

18. The optical telecommunication system of claim 16 further comprising a second transmission unit constructed in like fashion to said first transmission unit and operably connected to said second end of said transmission path, and a second receiver unit constructed in like fashion as said first receiver unit and operably connected to said first end of said transmission path; and wherein said first and second receiver units respectively detect signals applied to said first and second transmitter units such that full duplex communication is provided.

19. The optical telecommunication system of claim 16 further comprising an intermediate station on said transmission path between its first and second ends, said intermediate station including a second transmission unit constructed in like fashion to said first transmission unit and operably connected to an intermediate location of said transmission path, and a second receiver unit constructed in like fashion as said first receiver unit and operably connected to an intermediate location of said transmission path.

20. An optical telecommunication system comprising:
   a first receiver unit having:

separate first and second reception paths, each having an end which reflects back radiant energy;

means for reseparating first and second portions of radiant energy for passage separately and respectively on said first and second reception paths and for recombining said first and second portions, said first and second portions having been combined after separation and passage on different paths with a path length difference of $\Delta L_1$, one of the paths having application of a telecommunication signal by phase modulation thereon; and a first sensor connected to said means to reseparate and to recombine, said first sensor sensing radiant energy for detection of the telecommunication signal; and wherein said means for reseparating and recombining is a 4 by 4 coupler/splitter having a first side operable to receive a transmission signal and a second side, said first and second reception paths connected directly to said second side, said first sensor connected directly to said first side of said coupler/splitter by a first sensor path, and said first receiver unit further comprises a second sensor operable to sense radiant energy for detection of the telecommunication signal applied at the first transmission unit, and wherein said second sensor is connected directly to said first side of said coupler/splitter by a second sensor path.

* * * * *